E. G. ACHESON.
PRODUCTION OF ARTIFICIAL CRYSTALLINE CARBONACEOUS MATERIALS.
No. 11,473. Reissued Feb. 26, 1895.
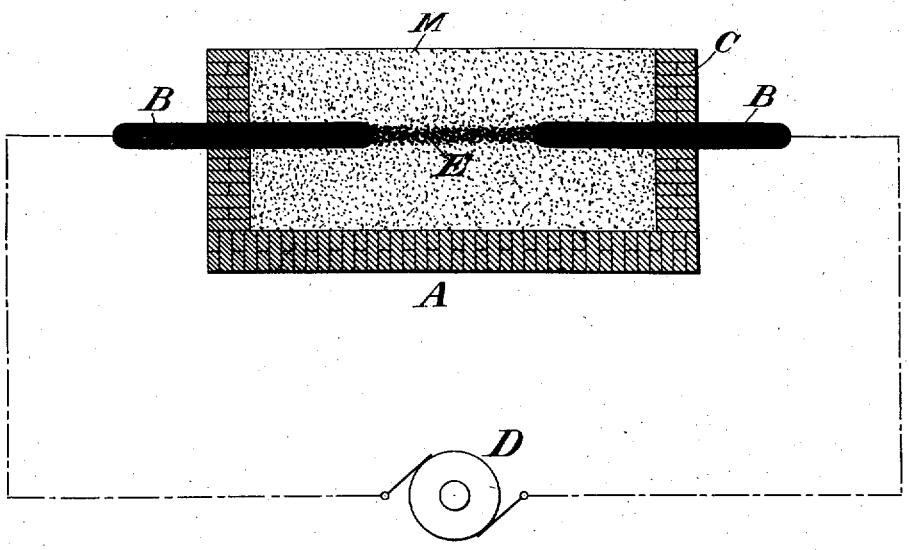
Witnesses
H. M. Corwin
N. L. Gill.
Inventor
Edward G. Acheson
by W. Bakewell & Sons
his Attorneys.

UNITED STATES PATENT OFFICE.

EDWARD G. ACHESON, OF MONONGAHELA CITY, PENNSYLVANIA, ASSIGNOR TO THE CARBORUNDUM COMPANY, OF SAME PLACE.

PRODUCTION OF ARTIFICIAL CRYSTALLINE CARBONACEOUS MATERIALS.

SPECIFICATION forming part of Reissued Letters Patent No. 11,473, dated February 26, 1895.

Original No. 492,767, dated February 28, 1893. Application for reissue filed January 28, 1895. Serial No. 536,509.

*To all whom it may concern:*

Be it known that I, EDWARD G. ACHESON, a citizen of the United States, and a resident of Monongahela City, Washington county, Pennsylvania, have invented certain new and useful Improvements in the Production of Artificial Crystalline Carbonaceous Materials, of which the following is a specification.

My invention relates to the production of artificial crystalline carbonaceous materials, and it has for its object to produce an artificial crystalline substance having the properties hereinafter more particularly set forth, and my invention consists in the various processes and products of said processes substantially as hereinafter more particularly set forth, whereby carbonaceous materials are treated and carbonaceous products produced which have the characteristics described, which carbonaceous products I have designated under the general term carborundum.

The primary object of my invention is to produce a carbonaceous material which shall have certain properties which render it useful as a substitute for diamonds, bort, and other abrasive material, and while I shall herein describe in a general way the characteristics of the products and the methods and means whereby they are produced, it is to be understood that I do not limit myself to any of the particulars set forth, as I intend to cover and claim broadly the new crystalline carbonaceous materials whether produced by the particular processes or methods set forth, or by any substantially equivalent methods, and for all purposes to which it may be applied.

I have discovered that carbonaceous materials in connection with certain other materials may be subjected to the action of heat, preferably that produced by an electric current in such a manner that as a result, a crystalline carbonaceous material is produced, which is a practical substitute for diamonds in their mechanical applications, as well as for corundum in its various forms, and other crystalline materials.

In the accompanying drawing I have shown one form of furnace which may be used.

In carrying out my invention, I take some carbonaceous material, preferably that which is as pure carbon as practicable, together with silica, or equivalent as silicate of alumina or of lime, &c., and mix these ingredients in proper proportion, and subject them to the action of an electric current of sufficient strength and a sufficient length of time, until the crystalline carbonaceous material is produced. In practice I find it advisable to use some material to act as a flux, such as common salt, or equivalent material.

I have found by experience that as a carbonaceous material, ordinary coke produced from bituminous coal, or gas coke carbon, natural or artificial, give good results, and the more nearly pure it is, the more satisfactory are the products. This carbonaceous material is reduced to a proper state of subdivision, and mixed with a proper proportion of silica, silicate or alumina or equivalent, and preferably with a flux such as common salt, when the whole mass is properly sub-divided and mingled thoroughly together. I then subject the mixture to a high degree of heat and preferably make use of what may be termed an electrical furnace. Any suitable furnace may be used, which is capable of withstanding the proper degree of heat, and the mixture is placed in the furnace in such a manner as to allow the current of electricity to be passed through the mass of material. Owing to the relatively high resistance of the mass when first introduced into the furnace, I find it is sometimes desirable to facilitate the passage of the current through the mass by introducing conducting material, preferably by forming a core of such conducting material through the mass, and I have found it convenient to use graphite in a loose or solid condition, although other materials may be used, but this does not apparently interfere with the process and the results as much as some other conductors.

Thus in the accompanying drawing, A represents a longitudinal section of any suitable furnace, which may be made of fire-brick or other material, having the electrodes B, C, extending through the walls of the furnace, and connected to a dynamo or other electric generator D, the mixture M, being placed within the furnace, and when the conducting core is used, it may be placed as indicated at E, between the ends of the electrodes. On the passage of the current of the proper strength, which is preferably less in the beginning of the operation than as it proceeds, and the current should be capable of regulation, the mass becomes highly heated, and the flux is melted, and the materials are subsequently brought into intimate association with each other, resulting in the crystalline carbonaceous products. During the process, chemical combinations and decompositions take place, resulting in the production of gases, vapors, and volatile salts which are permitted to escape from the furnace leaving in the furnace as products of the process graphite, amorphous carbon, and the carbonaceous product I have termed carborundum, while as a residue a portion of the charge remains only partially converted, representing the various stages of the conversion, and which may form a portion of another charge.

The proportions of the crystalline substance produced depend upon many circumstances and incidents relating to the process which need not be fully set forth. The crystalline substance is generally found in a zone surrounding the core, and the extent of this zone, and the character of the crystalline material depends upon many things, such as the strength of the current, the time of operation, the character of the material used, and other conditions.

As one convenient form of carrying out the process, I take of the pure carbon, say fifty per cent., of the silica or silicate of alumina twenty-five per cent., and common salt twenty-five per cent. by weight. The strength of the current depends upon many conditions, such as the amount of material, the characteristics thereof, and the rapidity with which the process is to be carried out. When the process is complete, the products are removed from the furnace and separated, the carbonaceous materials are freed from the graphite and other impurities, and broken into small pieces, and may be boiled and washed by decantation, and subsequently dried by heat. It can then be graded into different size crystals by sifting, or powdered by stamping machines and separated into different grades of powder by floating in water, and other well known means, and collected and dried ready for the market. The crystalline substance, as it is produced in the first instance, appears to the eye very brilliant, and usually of a dark color, the color depending to a large extent upon the materials used. The crystals do not appear to be regular, but resemble pieces of bort, the general form of the crystals being octohedral, although other well defined forms may be observed. Many of these crystals are opaque, but some are transparent and colorless, and others are of various colors. The crystals are extremely hard and highly refractive, withstanding, for a long time at least, an oxyhydrogen blast. As between working the process with a core and without, the former, that is, working with a core, is believed to be the best.

When the mixture consists of carbon, silica and chloride of sodium in about the proportions indicated, I have found that the resulting product which I have termed carborundum shows as an average sample, the following analysis:

| | Per cent. |
|---|---|
| Si | 69.19 |
| $Al_2O_3+Fe_2O_3$ | 0.38 |
| CaO | 0.19 |
| MgO | 0.06 |
| C | 29.71 |
| O | 0.47 |
| | 100.00 |

When the mixture is composed of carbon, clay (silicate of alumina) and chloride of sodium in about the proportions specified, an analysis of the product is as follows:

| | Per cent. |
|---|---|
| C | 30.09 |
| Si | 60.51 |
| $Al_2O_3Fe_2O_3$ | 4.78 |
| CaO | 0.17 |
| MgO | 0.18 |
| O | 4.27 |
| | 100.00 |

It thus appears that the material which I have designated as carborundum is practically a new compound hitherto unknown to chemistry, and in its purity is represented by the formula SiC, and may be known under the chemical term of silicide of carbon or carbide of silicon.

The new carbonaceous material in its crystalline or powdered form is adapted for many and various purposes which need not be fully set forth, but it has been found to be the practical substitute for diamond powder and bort in cutting diamonds and other gems. It can also be used in various ways as an abrasive material for optical purposes, dental work, grinding valves, and may be prepared by forming into wheels, disks, cloth or paper and other convenient forms for use.

One of the most important uses is in connection with electric lamps forming the light giving body or incandescent portion of the lamp, as its peculiar properties make it eminently fit for these purposes.

While I have thus described and set forth the general principles of my invention, and the general characteristics of my new product, it will be understood that the details may be varied or changed in many ways in carrying out the process.

What I claim is—

1. The within described product being silicide of carbon SiC.

2. The within described crystalline product containing a compound of silicon and carbon and being characterized by great hardness, refractability and infusibility.

3. The within described crystalline compound containing silicide of carbon SiC, and being characterized by its great hardness, refractability and infusibility.

4. The within described process of making a hard and refractive compound of carbon and silicon which consists in subjecting materials containing carbon and silica, free or combined to the action of an electric current.

5. The within described process of making a hard and refractive compound of carbon and silicon, which consists in subjecting materials containing carbon and silica, free or combined, to the action of an electric current, by passing the current through a conducting core embedded in the mass of such materials.

6. The within described process of making a hard and refractive compound of carbon and silicon, which consists in subjecting materials containing carbon, silica, free or combined and a suitable flux to the action of an electric current.

7. The within described process of making a hard and refractive compound of carbon and silicon which consists in subjecting materials containing carbon, silica, free or combined, a suitable flux and a core of conducting material to the action of an electric current.

8. The within described process of making a hard and refractive compound of carbon and silicon, which consists in subjecting materials containing carbon, silica, free or combined, and a metallic chloride to the action of an electric current.

9. The within described process of making a hard and refractive compound of carbon and silicon, which consists in subjecting materials containing carbon, silica, free or combined and a chloride of an alkali metal to the action of an electric current.

10. The within described process of making a hard and refractive compound of carbon and silicon, which consists in subjecting materials containing carbon, silica, free or combined, a chloride of an alkali metal and a core of conducting material to the action of an electric current.

In testimony whereof I have signed my name to this specification in the presence of two subscribing witnesses.

EDWARD G. ACHESON.

Witnesses:
H. H. WILLIAMS,
WM. H. ARISON.